United States Patent [19]
Albrecht et al.

[11] Patent Number: 5,999,351
[45] Date of Patent: Dec. 7, 1999

[54] MULTI-TRACK DENSITY DIRECT ACCESS STORAGE DEVICE

[75] Inventors: David William Albrecht; Wayne Leung Cheung, both of San Jose; Kok-Kia Chew, Fremont; Ju-Hi Hong, San Jose, all of Calif.; John Jeffrey Stephenson, Rochester, Minn.

[73] Assignee: International Business Machines Corporation, Armonk, N.Y.

[21] Appl. No.: 08/709,204

[22] Filed: Aug. 27, 1996

[51] Int. Cl.⁶ ........................................ G11B 5/09
[52] U.S. Cl. .................... 360/48; 360/98.01; 360/77.02; 360/78.04
[58] Field of Search .................... 360/48, 98.01, 360/77.02, 78.04, 78.06, 78.07, 133, 135; 369/44.29, 44.35, 44.36, 275.3, 51; 711/114

[56] References Cited

U.S. PATENT DOCUMENTS

| | | |
|---|---|---|
| 5,005,089 | 4/1991 | Thanos et al. . |
| 5,111,345 | 5/1992 | Muller . |
| 5,155,835 | 10/1992 | Belsan . |
| 5,278,712 | 1/1994 | Sugaya ........................................ 360/104 |
| 5,293,282 | 3/1994 | Squires et al. . |
| 5,325,509 | 6/1994 | Lautzenheiser . |
| 5,377,060 | 12/1994 | Nigam . |
| 5,383,068 | 1/1995 | Shimizu et al. ...................... 360/78.06 |
| 5,515,212 | 5/1996 | Chiao et al. ............................... 360/48 |
| 5,592,346 | 1/1997 | Sullivan ............................... 360/77.04 |

FOREIGN PATENT DOCUMENTS

| | | | |
|---|---|---|---|
| 58-147802 | 9/1983 | Japan ....................................... 360/48 |

*Primary Examiner*—Alan Faber
*Attorney, Agent, or Firm*—Noreen A. Krall; Antony P. Ng; Andrew J. Dillon

[57] ABSTRACT

A multi-track density direct access storage device is disclosed. In accordance with a preferred embodiment of the present invention, a direct access storage device for data storage within a data processing system comprises a housing, a rotatable spindle, at least one disk, and several heads. The disk is fixedly mounted to the rotatable spindle, and the rotatable spindle is rotated by a motor within the housing. A first disk surface of the disk has a first track density and a second disk surface of the disk has a second track density; wherein the second track density is preferably greater than the first track density. Each of the several heads contains a transducer to read and write information from and to the disk during the disk rotation. Under this configuration, the lower storage density first disk surface is utilized to store data that are frequently accessed while the higher storage density second disk surface is for storage capacity supplementation such that the total data storage capacity of the direct access storage device can be increased without degrading the data-accessing performance.

17 Claims, 7 Drawing Sheets

MULTI-TRACK DENSITY DIRECT ACCESS STORAGE DEVICE

BACKGROUND OF THE INVENTION

1. Technical Field

The present invention relates to an apparatus for data storage in general, and in particular, to an apparatus for storing data within a data processing system. Still more particularly, the present invention relates to a direct access storage device having multiple track density for storing data within a data processing system.

2. Description of the Prior Art

Direct access storage devices (DASDs) are generally utilized for long-term storage of data within a data processing system, and hard disk drives are one type of DASDs. A hard disk drive utilizes several rotatable disks for data storage. Data are represented on the disks as a series of magnetically polarized regions. These polarized regions are arrayed along the surface of a disk as either concentric data tracks or spiral data tracks. A read/write head is utilized to read data from or write data to different data tracks on the disk while the disk is rotating underneath the read/write head.

Increasing usage of high-volume file servers in local-area networks and wide-area networks has led to an increasing demand for higher capacity hard disk drives. Thus, dramatic improvements on the hard disk storage technology are required in order to keep pace with such demand. Generally, the storage capacity of a hard disk drive can be expanded by increasing both the track density and the linear data density of the hard disk drive. In conjunction, the track-seeking speed of the hard disk drive should also be increased accordingly.

In order to assure performance and reliability for a high track density design, the read/write head of the hard disk drive must be positioned extremely accurately over the data track center by a servo controller. At the same time, because high track-seeking speed tends to cause poor head settling and high track-misregistration (TMR) to the hard disk drive, the servo controller must also be optimized to provide a minimal Seek-Settling TMR after moving the head from one track to another and to maintain an adequate Tracking TMR during read and write operations.

Nevertheless, although a high bandwidth servo controller designed to have an aggressive seek profile can perform seeking with a very short seek-time, a fast seek-time often induces extra head vibrations and instability that lead to a high Seek-Settling TMR. For example, a typical fast-seek operation across one-third of a disk data surface for a 3.5-inch drive can complete in about 8 ms, but such high seek-time could also cause a Seek-Settling TMR as high as 10% of a full track width. Certainly, a low bandwidth servo controller having a less aggressive seek profile (e.g., seek time>13 ms) can reduce the Seek-Settling TMR significantly, if not eliminate the Seek-Settling TMR completely. Further, a low bandwidth servo controller can even substantially improve the Tracking TMR during the read and write operations because of the added attenuation on the dynamic noise, resonances, servo-track format errors, and position-sensing errors. However, the penalty is that all read and write operations will also be delayed by the low bandwidth servo controller due to the prolonged seeking operations.

This is the dilemma: it is possible to increase the storage capacity of a hard disk drive without increasing the TMR simply by utilizing a low bandwidth servo controller; however, the resulting degraded performance from the prolonged seeking operation is undesirable for any normal user applications. On the other hand, a higher TMR may be acceptable for a higher storage capacity design with an improved error correction coding (ECC) and processing. At least the addition of extra ECC in the data storage can improve the soft error rate (SER). For example, by doubling the ECC from 20 bytes to 40 bytes in a data block of 512 bytes, statistically, SER is improved from $10e^{-10}$ to $10e^{-20}$. Nonetheless, the additional ECC and processing also decrease the data access performance which again is undesirable for normal user applications.

Consequently, it would be desirable to provide an improved direct access storage device with a high data-storage capacity but without the degraded data-access performance.

SUMMARY OF THE INVENTION

In view of the foregoing, it is therefore an object of the present invention to provide an improved apparatus for data storage.

It is another object of the present invention to provide an improved apparatus for storing data within a data processing system.

It is yet another object of the present invention to provide an improved direct access storage device having multiple track density for storing data within a data processing system.

In accordance with a preferred embodiment of the present invention, a direct access storage device for data storage within a data processing system comprises a housing, a rotatable spindle, at least one disk, and several heads. The disk is fixedly mounted to the rotatable spindle, and the rotatable spindle is rotated by a motor within the housing. A first disk surface of the disk has a first track density and a second disk surface of the disk has a second track density; wherein the second track density is preferably greater than the first track density. Each of the several heads contains a transducer to read and write information from and to the disk during the disk rotation. Under this configuration, the lower storage density first disk surface is utilized to store data that are frequently accessed while the higher storage density second disk surface is for storage capacity supplementation such that the total data storage capacity of the direct access storage device can be increased without degrading the data-accessing performance.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4b is a detailed depiction of a typical positional relationship of data fields to other types of fields on the disk of FIG. 4a;

DETAILED DESCRIPTION OF PREFERRED EMBODIMENT

The present invention is applicable to a variety of direct access storage devices for a computer. The computer may be a stand-alone system or part of a network such as a local-area network (LAN) or a wide-area network (WAN). For the purpose of illustration, a preferred embodiment of the present invention, as described below, is implemented on a disk drive within a personal computer such as the Aptiva™ series manufactured by International Business Machines Corporation.

I. Organization of a Personal Computer System

Figure 1:
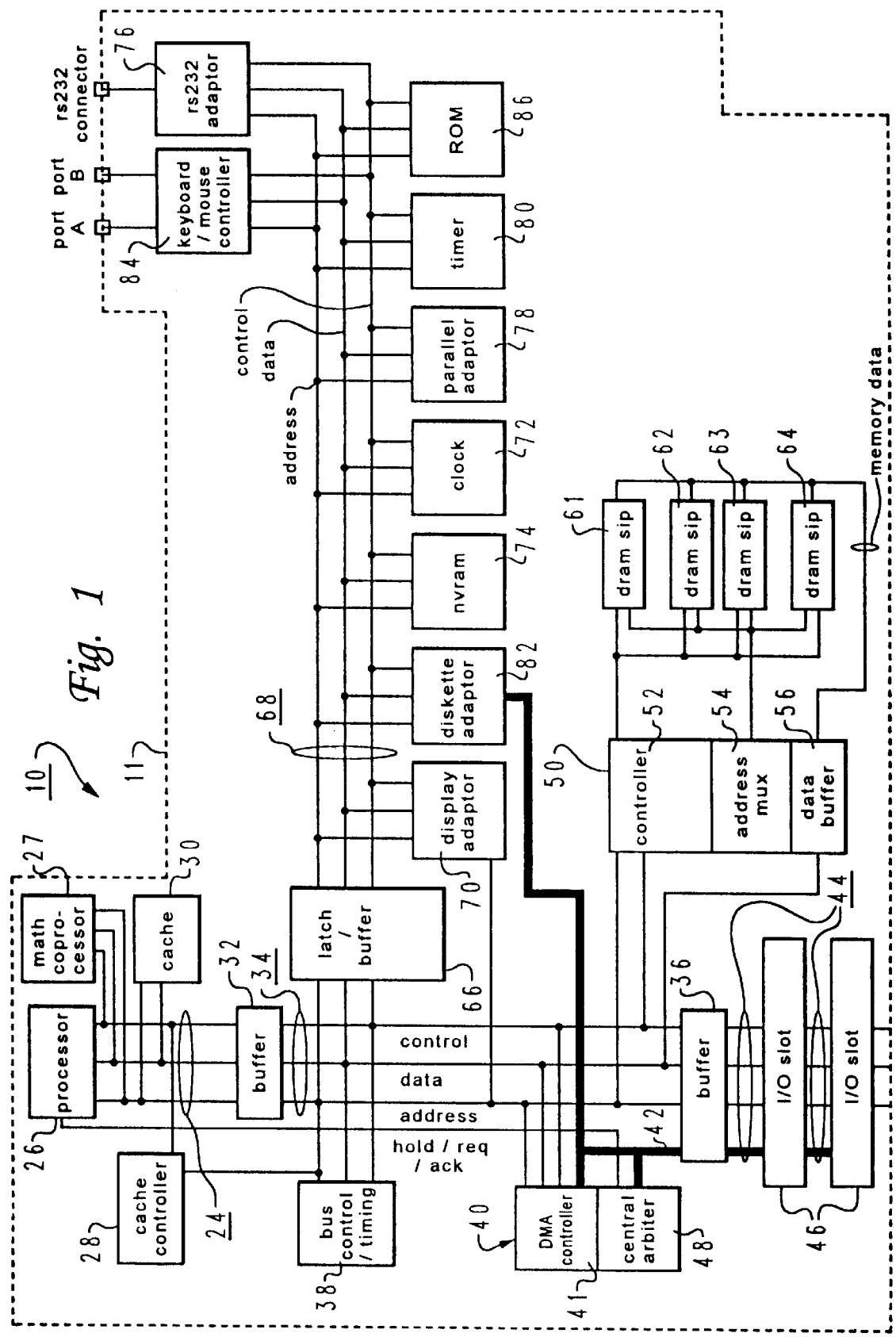
FIG. 1 is a block diagram of a computer system in which a preferred embodiment of the present invention can be employed.

Referring now to the drawings and in particular to FIG. 1, there is depicted a block diagram of a personal computer 10 in which a preferred embodiment of the present invention may be applied. As shown, processor 26 is connected to a local bus 24. Local bus 24, which comprises address, data, and control components, provides for the connection of processor 26, a math co-processor 27, a cache controller 28, and a cache memory 30. Also coupled to local bus 24 is a buffer 32.

Buffer 32 is itself connected to a slower speed (relative to local bus 24) system bus 34 which also comprises address, data, and control components. System bus 34 extends between buffer 32 and buffer 36. System bus 34 is further connected to bus control and timing unit 38 and a Direct Memory Access (DMA) unit 40. DMA unit 40 is comprised of a DMA controller 41 and a central arbitration unit 48. An arbitration control bus 42 couples DMA controller 41 and central arbitration unit 48 to I/O slots 46 and diskette adaptor 82. Buffer 36 provides an interface between system bus 34 and an optional feature bus 44, such as, for example, a Micro-Channel™ bus. Connected to feature bus 44 are several I/O slots 46 for receiving adaptor boards which may be further connected to various I/O devices. For example, one of I/O slots 46 may be utilized for accessing a hard disk drive via an adaptor and a hard drive controller as will be described below.

Also connected to system bus 34 is a memory control unit 50 which is comprised of a controller 52, an address multiplexer 54, and a data buffer 56. Memory control unit 50 is further connected to a random access memory as represented by DRAM SIP modules 61, 62, 63, and 64. Controller 52 includes the logic for mapping addresses to and from processor 26 to particular areas of DRAM SIP modules 62–64.

A latch/buffer 66 is coupled between system bus 34 and planar I/O bus 68. Planar I/O bus 68 also comprises address, data, and control components. Coupled along planar I/O bus 68 are a variety of I/O adaptors, such as display adaptor 70, RS-232 adaptor 76, parallel adaptor 78, and diskette adaptor 82, and peripheral components such as clock 72, non-volatile random access memory (NVRAM) 74, timer 80, keyboard/mouse controller 84, and read-only memory (ROM) 86.

Clock 72 is utilized to calculate the time of day. NVRAM 74 is utilized to store system configuration data such as the values which describe the present configuration of the system. For example, NVRAM 74 contains information which describes the capacity of a hard disk drive, the type of display monitor, the amount of memory, etc. Of particular importance, NVRAM 74 contains data which is utilized to describe the system console configuration, such as whether a PC keyboard is connected to the keyboard/mouse controller 84, whether a display controller is available, or whether an ASCII terminal is connected to RS-232 adaptor 76. Furthermore, these data are stored in NVRAM 74 whenever a special configuration program is executed. The purpose of this special configuration program is to update the values which characterize the configuration of personal computer 10. ROM 86 includes a Basic Input/Output System (BIOS) which provides a user the transparent communications between various I/O devices.

Connected to keyboard/mouse controller 84 are ports A and B. These ports are utilized to connect a PC keyboard and/or other input device, such as a mouse, to personal computer 10. Coupled to RS-232 adapter unit 76 is an RS-232 connector. An optional ASCII terminal can be coupled to personal computer 10 via this RS-232 connector.

II. Features of a Hard Disk Drive and a Controller

Figure 2:
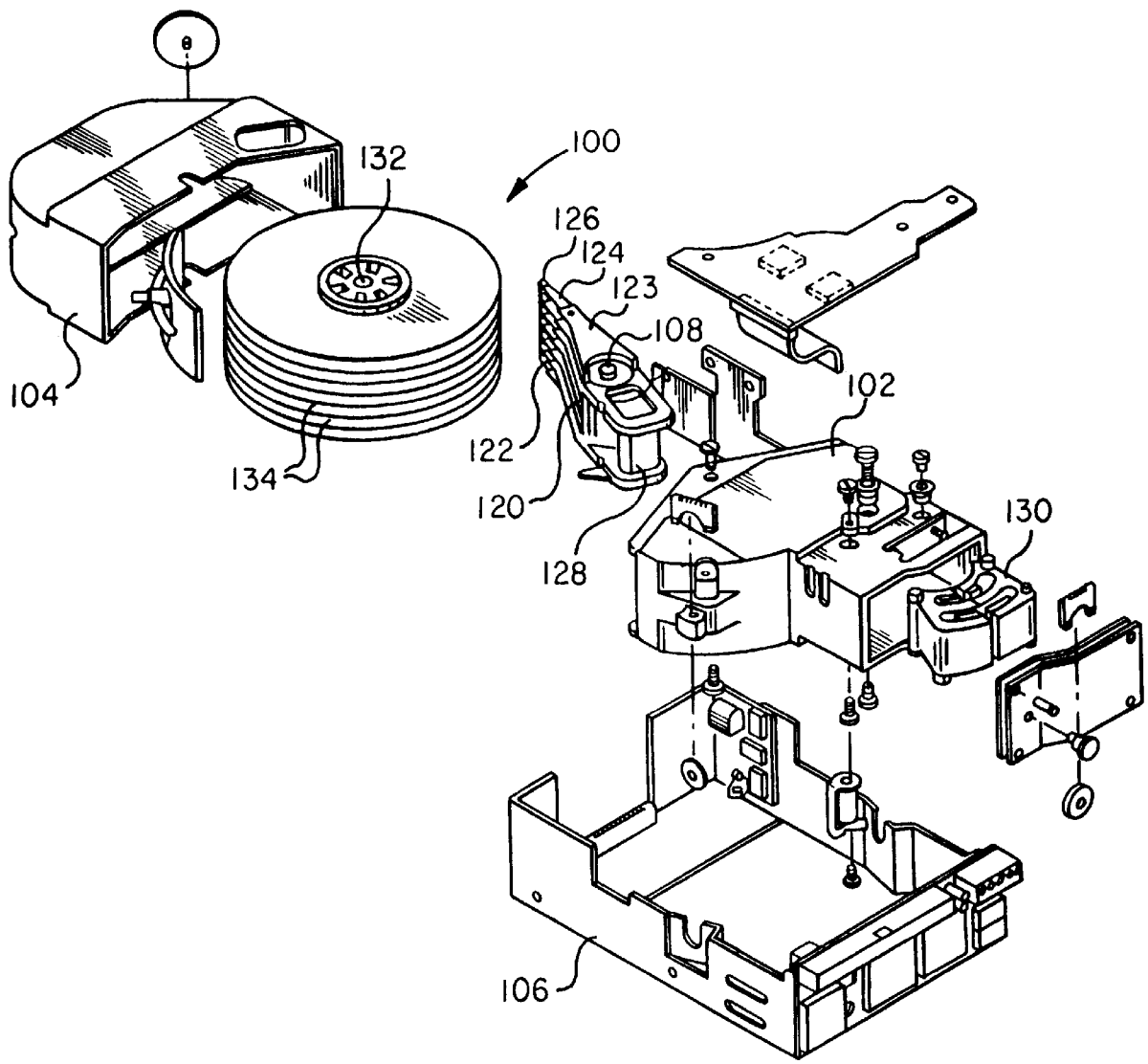
FIG. 2 is an exploded perspective view of a hard disk drive in accordance with a preferred embodiment of the present invention.

With reference now to FIG. 2, there is depicted an exploded view of a disk drive 100 in accordance with a preferred embodiment of the present invention. Disk drive 100 includes a housing 102 and a housing cover 104 which, after assembly, is mounted within a frame 106. Rotatably attached within housing 102 on an actuator shaft 108 is an actuator arm assembly 120. One end of actuator arm assembly 120 includes an E-block (or comb-like structure) 122 having several arms 123. Attached to arms 123 on E-block 122 are load springs 124. As shown, load springs 124 form the suspension. Attached at the end of each of load springs 124 is a slider 126 which carries a pair of transducers commonly known as the head. The transducers may be of an inductive type or a magneto-resistive type. On the other end of actuator arm assembly 120 opposite load springs 124 and sliders 126 is a voice coil 128. Also, E-block 122 is preferably designed to have less head suspension.

Attached within housing 102 is a pair of magnets 130. The pair of magnets 130 and voice coil 128 are key parts of a voice coil motor which applies a force to actuator arm assembly 120 to rotate it about actuator shaft 108. Also mounted within housing 102 is a spindle shaft 132. Rotatably attached to spindle shaft 132 are a set of disks 134 arranged in accordance with a preferred embodiment of the present invention. As shown, a total of five disks are attached to spindle shaft 132 in spaced-apart relation. An internal motor (not shown) within housing 102 rotates disks 134.

Figure 3:
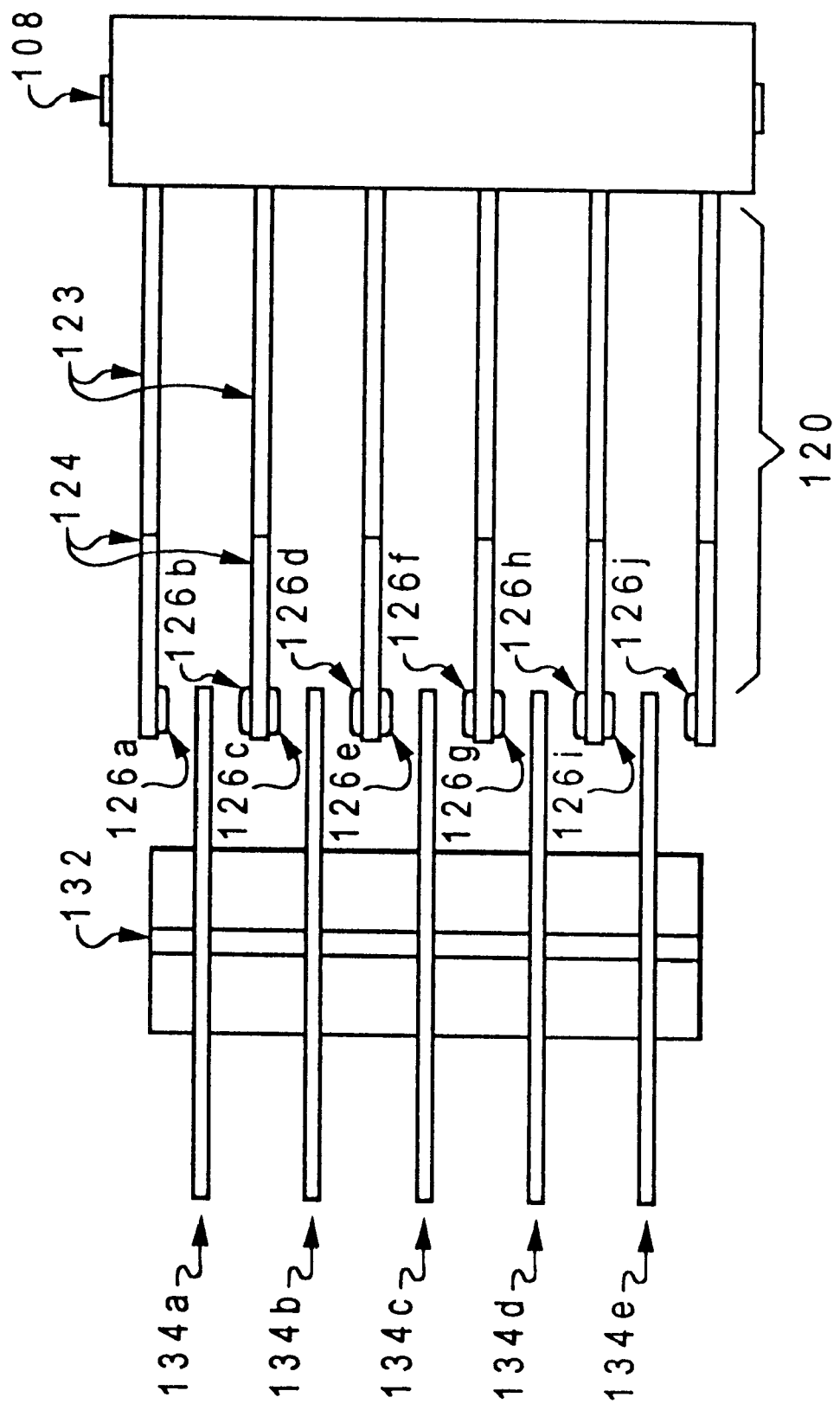
FIG. 3 is a cross-sectional view of the disks from FIG. 2 arranged in accordance with a preferred embodiment of the present invention.

Referring now to FIG. 3, there is illustrated a cross-sectional view of the disks from FIG. 2 arranged in accordance with a preferred embodiment of the present invention. As shown, disks 134a, 134b, 134c, 134d, and 134e are rotatably attached to spindle shaft 132. Also shown is an actuator arm assembly 120, which is comprised of arms 123 and load springs 124, accessing disks 134a–134e via sliders 126a–126j. Actuator arm assembly 120 is also rotatably attached to actuator shaft 108.

Each of disks 134a–134e has two magnetic storage surfaces which are designed to store data. The storage capacity of each of disks 134a–134e is measured by the track density on the disk. There are at least two types of disks, a high-density storage disk and a low-density storage disk, commingling among disks 134a–134e. The high-density storage disk is designed to have narrow track widths with high-storage capacity but slow data access speed. On the other hand, the low-density storage disk is designed to have wide track widths with low-storage capacity but fast data access speed. As a preferred embodiment of the invention, the high-density storage disk contains at least 50% more data tracks than the low-density storage disk. Specifically, the track density for the high-density storage disk is approximately 9000 tracks per inch (TPI) and the track density for the low-density storage disk is approximately 6000 TPI. As a preferred embodiment of the invention, disk 134b is the low-density storage disk while remaining disks 134a, 134c, 134d and 134e are the high-density disks. In addition, each of the read and write transducers of sliders 126c and 126d is preferred to have a wider magnetic read and write width as compared to the read and write transducers of the rest of sliders 126a–126j, in order to complement low-density disk 134b.

Figure 4A:
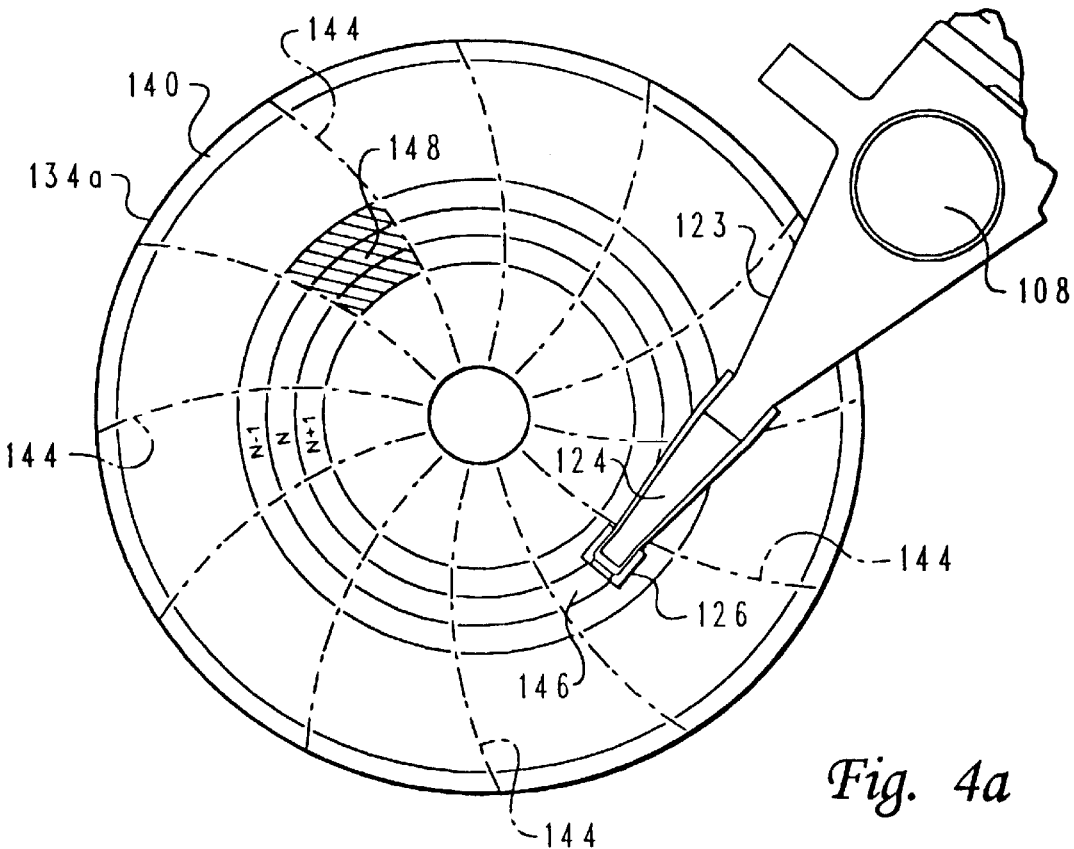
FIG. 4a is a top view of a disk and a rotatable arm within the hard disk drive of FIG. 2.

With reference now to FIG. 4a, there is illustrated a top view of a disk and a rotatable arm within the hard disk drive of FIG. 2. A slider 126 is positioned by a rotatable arm 123 over one of several tracks (1 to N+1) on a magnetic surface 140 of a disk 134a. Each track is divided into several sectors by several track servo fields 144 extending radially from the center of disk 134a. During operation, slider 126 glides between servo fields 144. As shown, track servo fields 144 are curved in order to conform with the travelling trajectory of slider 126. However, if a linearly actuated armature is utilized, track servo fields 144 will be straight instead of curved. In addition, if the disk rotational speed is constant, the transducer mounted to slider 126 will encounter each track servo field 144 at strict intervals of times. Tracking information can be derived from track servo fields 144 in a manner that is well known in the art. As mentioned above, track width 146 of disk 134a is narrower than that of disk 134b because disk 134a is a high-density storage disk.

Figure 4B:
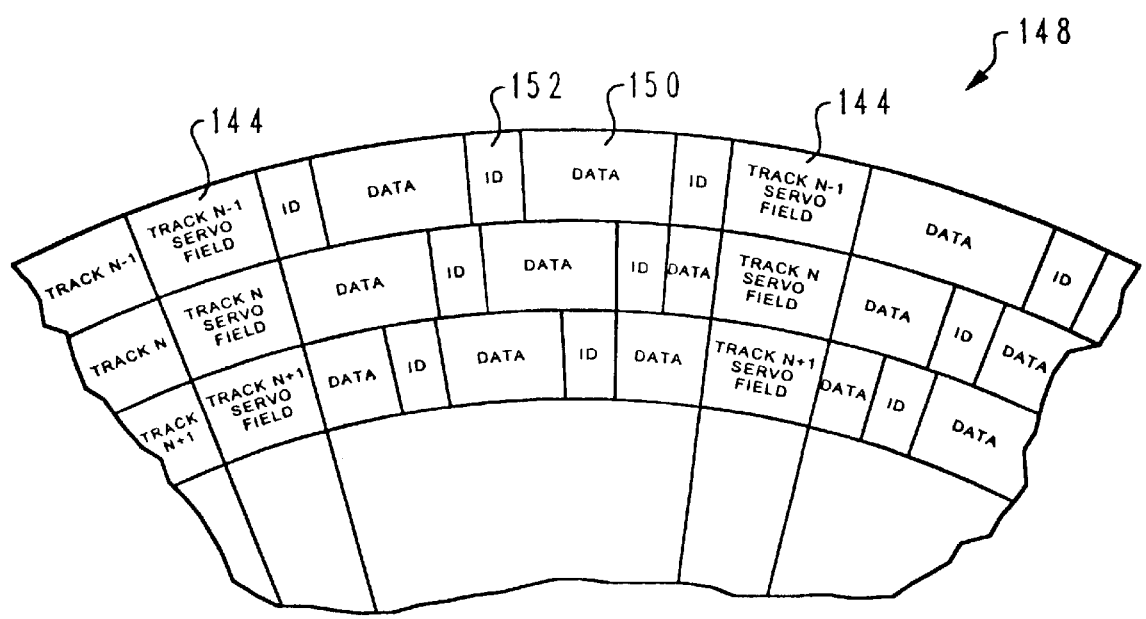

With reference now to FIG. 4b, there is a detailed depiction of the shaded region 148 of FIG. 4a, displaying a typical positional relationship of data fields to other types of fields on disk 134a. As shown, several data fields 150 have been written onto tracks N-1, N, and N+1. Each data field 150 is preceded by an ID field 152. Generally, a data field 150 can straddle over a servo field 144. While a data field 150 typically includes a preliminary synchronization field (not shown), a second synchronization field (not shown) may be included after a servo field 144 where it bisects a data field 150. While some types of hard disk drives have one data field per data sector positioned between each track servo field, other types of disk drives have a data field straddle across parts of more than one data sector, and thus, more than one data field may be positioned between a pair of servo fields.

Figure 5:
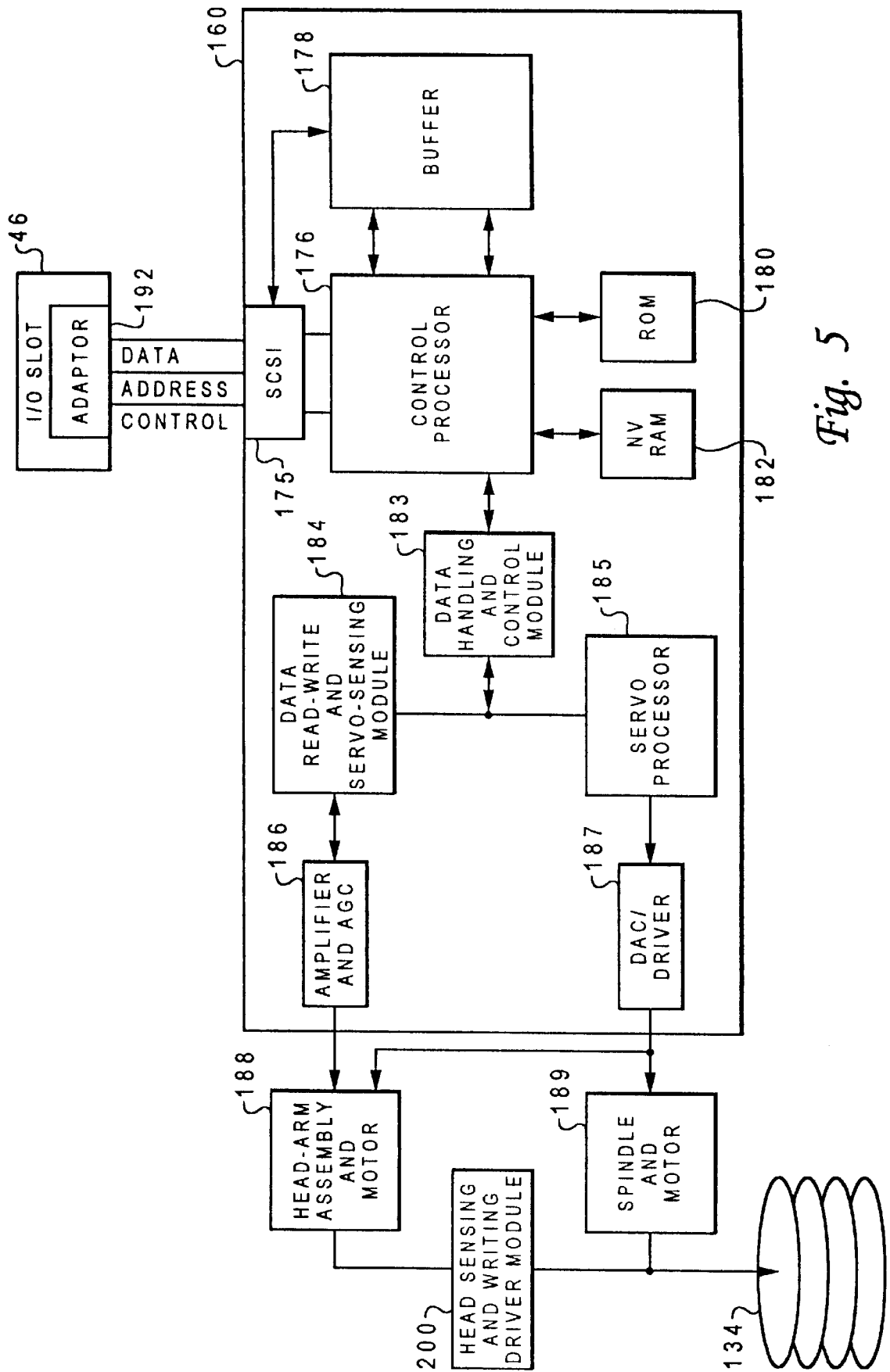
FIG. 5 is a block diagram of the control circuitry within the hard disk drive of FIG. 2.

Referring now to FIG. 5, there is illustrated a block diagram of the control circuitry within the hard disk drive of FIG. 2. Control circuitry 160 communicates with a host computer system through an interface 175 such as a small computer system interface (SCSI). For a personal computer 10 of FIG. 1, interface 175 is connected to an adaptor 192 which may be plugged into one of I/O slots 46. Control circuitry 160 controls the storage of data to and the recovery of data from disks 134. Control circuitry 160 comprises control processor 176, buffer 178, data-handling and control module 183, data read-write and servo-sensing module 184, servo processor 185, amplifier and automatic gain control (AGC) 186, and digital-to-analog converter (DAC)/motor driver 187.

Control processor 176 may be initialized upon system power up, or it may have access to a small read-only memory (ROM) 180 and a small NVRAM 182 for program instructions. ROM 180 may hold a supervisor program executable on control processor 176 to carry out the process of the invention. As provided by the invention, control processor 176 may access buffer 178 for commands of execution. In addition, buffer 178 is also for temporarily holding data in transit between personal computer 10 and disks 134. After the physical location on disks 134 has been determined by servo-sensing circuit within data read-write and servo-sensing module 184, servo processor 185 then sends signals, which is then converted to analog form for motor control by DAC/motor-driver 187. Head-arm assembly & motor 188 and spindle & motor 189 then access disks 134. Typically, servo processor 185 is a high-speed digital signal processor. Data read and write operations are performed by head-sensing and writing driver module 200, processed by amplifier and AGC 186 and data read-write circuits within data read-write and servo-sensing module 184. Data conversion, ECC, and control-timing functions are provided by data handling and control module 183.

III. Servo Control and Operations

Figure 6:
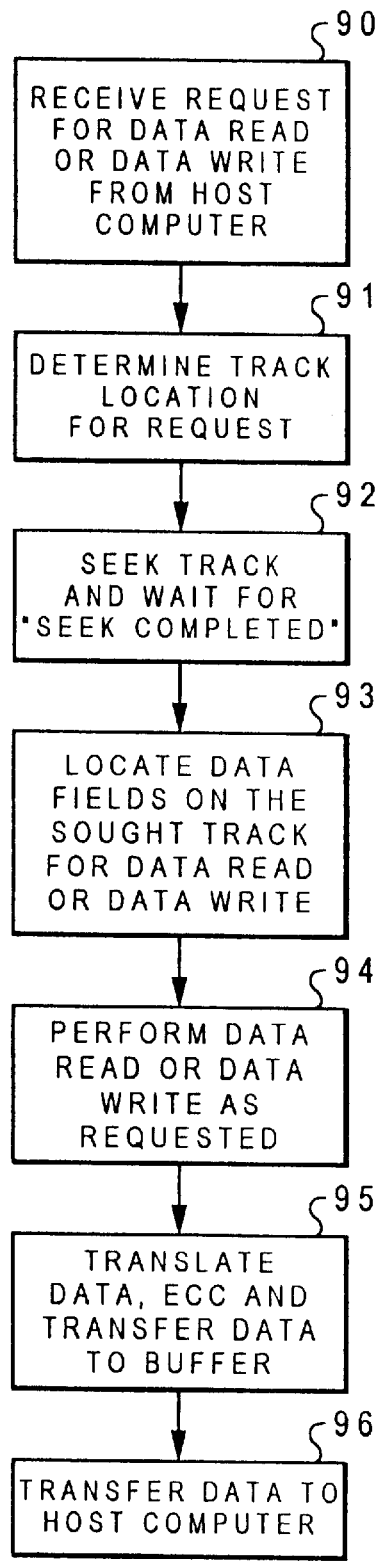
FIG. 6 is a high-level flow diagram of a host computer data-access process in accordance with a preferred embodiment of the present invention.

With reference now to FIG. 6, there is illustrated a high-level flow diagram of a data access process by a host computer, in accordance with a preferred embodiment of the present invention. Starting at block 90, a request for a data read or data write is received from personal computer 10. If the request is for a data write, the data may be transferred to buffer 178 at this point. Control processor 176 then determines the physical track location on the disk to be accessed for the read or write request by translating the logical address sent from personal computer 10 to a physical address on disks 134, as shown in block 91. Next, control processor 176 commands servo processor 185 to seek while control processor 176 waits for a return "seek completed" status, as illustrated in block 92. The details of this process will be described below. Control processor 176 subsequently locates the exact data field(s) after the track seek, as depicted in block 93. Afterwards, data read-write and servo-sensing module 184 can perform either a data read or a data write, depending on the request, as shown in block 94. If it is a data read, then control processor 176 and control logic 183 first perform a code conversion and ECC of the data, then send the data to buffer 178, as shown in block 95; and, subsequently, the data is transferred to personal computer 10, as depicted in block 96.

Figure 7:
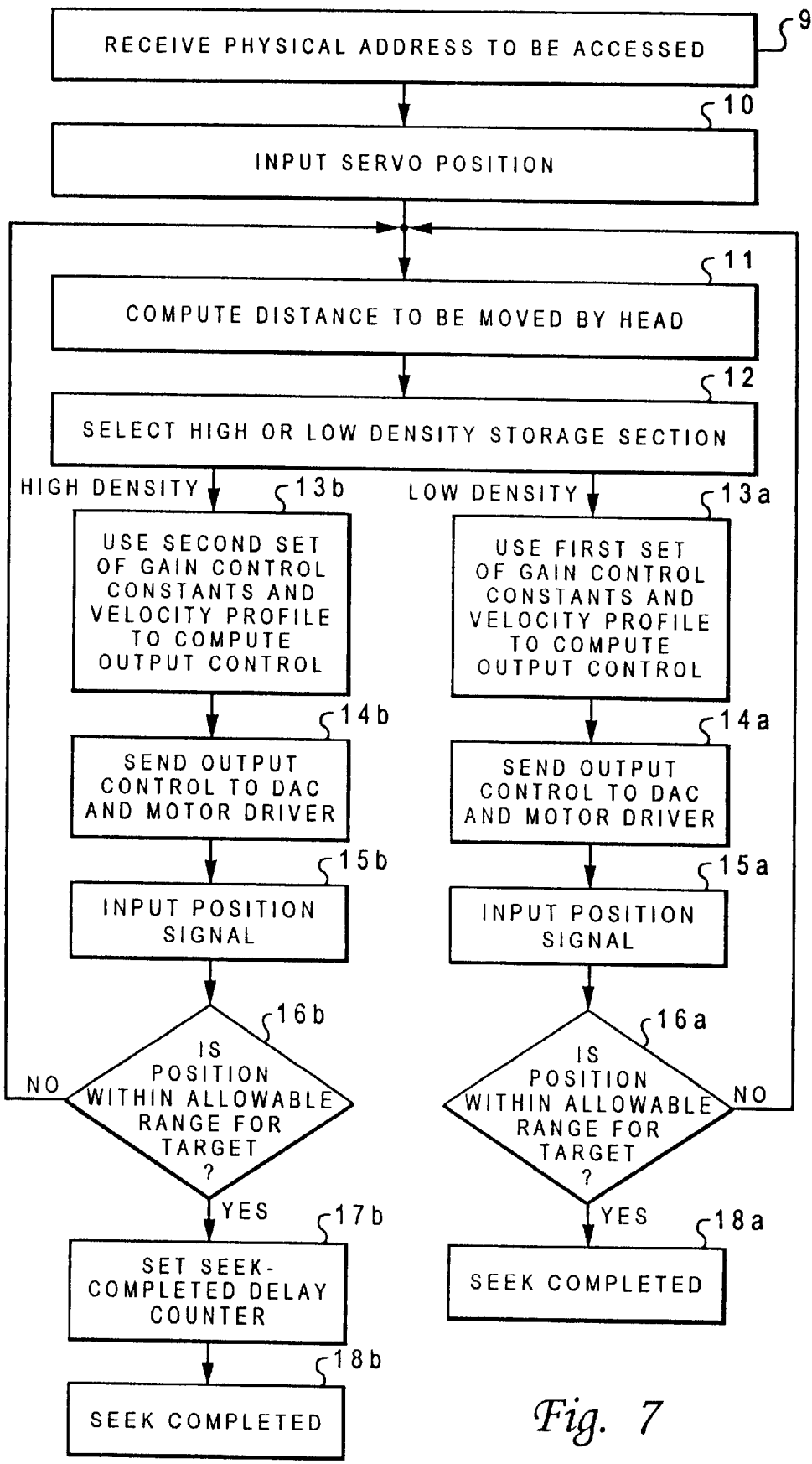
FIG. 7 is a high-level flow diagram of a seek operation sequence performed by the servo processor within the hard disk drive of FIG. 2, in accordance with a preferred embodiment of the present invention.

Referring now to FIG. 7, there is illustrated a high-level flow diagram of a seek operation sequence performed by servo processor 185, in accordance with a preferred embodiment of the present invention. Starting at block 9, servo processor 185 receives from control processor 176 a physical target address to be accessed. With the servo position signal input from data read-write and servo-sensing module 184, servo processor 185 computes the distance to be moved by the head, as illustrated in block 10 and 11, respectively. Then, a high-density or low-density storage section is selected, depending on the physical location of the data requested by personal computer 10, as shown in block 12. If the low-density storage section is selected, a first set of servo gain-control constants (e.g., K1 ... Ki) and velocity profile (e.g., D1 ... Di) are utilized to compute a control output, as depicted in block 13a. Next, the computed control output is sent to DAC/motor-driver 187, as shown in block 14a, and the position signal is input, as shown in block 15a. A determination is then made as to whether the distance to target is within the allowable range, as depicted in block 16a. If the distance to target is not within the allowable range, the process returns back to block 11; otherwise, if the distance to target is within the allowable range, a seek-completed status is returned to control processor 176, as shown in block 18a.

If the high-density storage section is selected, a second set of servo gain control constants (e.g., k1 . . . ki) and velocity profile (e.g., d1 . . . di) are utilized to compute a control output, as shown in block 13b. Next, the computed control output is sent to DAC/motor-driver 187, as depicted in block 14b, and the position signal is input, as depicted in block 15b. A determination is then made as to whether the distance to target is within the allowable range, as illustrated in block 16b. If the distance to target is not within the allowable range, the process returns back to block 11; otherwise, if the distance to target is within the allowable range, a seek-completed counter is set for approximately 5 ms, and then waits for the seek-completed counter to time out, as shown in block 17b. This delay is for the head to settle. Finally, a seek completed status is returned to control processor 176, as shown in block 18b.

The disk design and arrangement as described above, along with an appropriate mechanism to place the most active user files in the low-density storage disk, can ensure that the overall performance of the computer system is much greater than nominal. A low-density storage disk may be achieved by: 1) commanding faster actuator seeks; 2) writing wider (or reading narrower) data tracks so that positioning accuracy can be slightly compromised with faster seeks; 3) ensuring the most frequently utilized information is residing on shorter data zones of the disks; 4) storing the most recently utilized data on the outer zones of the disks because the outer zones are capable of storing more information, especially with zone recording; 5) utilizing faster channels; and 6) utilizing spiral data tracks so that latency in one-track seeks may be eliminated.

On the contrary, a high-density storage disk may be achieved by: 1) increasing seek and/or settling times which reduce settle TMR and allowing more time for better control algorithms to attain minimum variance, 2) reducing the servo bandwidth which reduces the TMR contribution from noise and servo overhead from reduced sampling times (reducing servo bandwidth also reduces effects from actuator mechanical resonances and makes the electrical notch filters more effective), and 3) increasing ECC functions for reduced data error rate.

An alternative embodiment of the present invention is to have two (or more) differing sets of actuator arm assembly with heads, and servo and channel systems on different actuator pivot bearings that access different disks. The differing sets of actuators can be designed with performances specifically for accessing information stored in disks of a specific track density attached to the same spindle.

As has been described, the present invention provides an improved direct access storage device with a high data storage capacity but without the degraded data access performance. The above detailed description is of the best presently contemplated mode for carrying out the invention. However, it is understood by one who is skilled in the art that at least one more different track density disk can be added to the present configuration. Hence, this description is not to be taken in a limiting sense but is made merely for the purpose of illustrating the general principles of the invention.

While the invention has been particularly shown and described with reference to a preferred embodiment, it will be understood by those skilled in the art that various changes in form and detail may be made therein without departing from the spirit and scope of the invention.

What is claimed is:

1. A direct access storage device for data storage within a data processing system, said direct access storage device comprising:
   a housing;
   a rotatable spindle;
   a motor within said housing for rotating said rotatable spindle;
   at least one disk fixedly mounted to said rotatable spindle, a first disk surface of said at least one disk having a first track density and a second disk surface of said at least one disk having a second track density, wherein said second track density is higher than said first track density;
   a plurality of heads each containing a transducer to read and write data from and to said at least one disk during rotation thereof; and
   a control circuit for controlling said plurality of heads.

2. The direct access storage device for data storage within a data processing system according to claim 1, wherein said first disk surface having a first track width and said second disk surface having a second track width, wherein said first track width is wider than said second track width.

3. The direct access storage device for data storage within a data processing system according to claim 1, wherein said first track density is approximately 6000 tracks per inch and said second track density is approximately 9000 tracks per inch.

4. The direct access storage device for data storage within a data processing system according to claim 1, wherein said second disk surface contains at least 50% more data tracks than said first disk surface.

5. The direct access storage device for data storage within a data processing system according to claim 1, said direct access storage device further comprising a servo controller, wherein said servo controller has a high bandwidth loop for access control to said first disk surface and a low bandwidth loop for access control to said second disk surface.

6. The direct access storage device for data storage within a data processing system according to claim 1, said at least one disk includes two disks and wherein said first disk surface is on a first one of said two disks and said second disk surface is on a second one of said two disks.

7. A direct access storage device for data storage within a data processing system, said direct access storage device comprising:
   a housing;
   a rotatable spindle;
   a motor within said housing for rotating said rotatable spindle;
   at least one disk fixedly mounted to said rotatable spindle, a first disk surface of said at least one disk having a first track density and a second disk surface of said at least one disk having a second track density, wherein said second track density is higher than said first track density;
   at least one actuator arm assembly that contains a plurality of heads having a transducer to read and write data from and to said at least one disk during rotation thereof; and a control circuit for controlling said plurality of heads.

8. The direct access storage device for data storage within a data processing system according to claim 7, wherein said first disk surface having a first track width and said second disk surface having a second track width, wherein said first track width is wider than said second track width.

9. The direct access storage device for data storage within a data processing system according to claim 7, wherein said first track density is approximately 6000 tracks per inch and said second track density is approximately 9000 tracks per inch.

10. The direct access storage device for data storage within a data processing system according to claim 7, wherein said second disk surface contains at least 50% more data tracks than said first disk surface.

11. The direct access storage device for data storage within a data processing system according to claim 7, said direct access storage device further comprising a first servo controller and a second servo controller, wherein said first servo controller has a high bandwidth loop for access control to said first disk surface and said second servo controller has a low bandwidth loop for access control to said second disk surface.

12. The direct access storage device for data storage within a data processing system according to claim 7, said at least one disk includes two disks and wherein said first disk surface is on a first one of said two disks and said second disk surface is on a second one of said two disks.

13. A direct access storage device for data storage within a data processing system, said direct access storage device comprising:

a housing;

a rotatable spindle;

a motor within said housing for rotating said rotatable spindle;

a plurality of disks fixedly mounted to said rotatable spindle, wherein at least one disk among said plurality of disks has a first track density and the remaining disks among said plurality of disks have a second track density, wherein said second track density is higher than said first track density;

a plurality of heads each containing a transducer to read and write data from and to said plurality of disks during rotation thereof; and a control circuit for controlling said plurality of heads.

14. The direct access storage device for data storage within a data processing system according to claim 13, wherein said at least one disk of said plurality of disks has a first track width and the remaining disks of said plurality of disks have a second track width, wherein said first track width is wider than said second track width.

15. The direct access storage device for data storage within a data processing system according to claim 13, wherein said first track density is approximately 6000 tracks per inch and said second track density is approximately 9000 tracks per inch.

16. The direct access storage device for data storage within a data processing system according to claim 13, wherein the remaining disks of said plurality of disks contains at least 50% more data tracks than said at least one disk.

17. The direct access storage device for data storage within a data processing system according to claim 13, said direct access storage device further comprising a servo controller, wherein said servo controller has a high bandwidth loop for access control to said at least one disk and a low bandwidth loop for access control to the remaining disks.

* * * * *